(12) United States Patent
Miyawaki

(10) Patent No.: US 6,700,725 B1
(45) Date of Patent: Mar. 2, 2004

(54) SIGNAL PROCESSING METHOD AND MODE SWITCH FOR MAGNETIC RECORDING AND REPRODUCING APPARATUS

(75) Inventor: Chikanori Miyawaki, Neyagawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 311 days.

(21) Appl. No.: 09/806,094
(22) PCT Filed: Jul. 21, 2000
(86) PCT No.: PCT/JP00/04918
§ 371 (c)(1), (2), (4) Date: Mar. 27, 2001
(87) PCT Pub. No.: WO01/11621
PCT Pub. Date: Feb. 15, 2001

(30) Foreign Application Priority Data

Aug. 6, 1999 (JP) ............................................. 11/223150

(51) Int. Cl.$^7$ ................................................ G11B 15/18
(52) U.S. Cl. .......................................................... 360/71
(58) Field of Search ................................ 360/71, 75, 93, 360/94, 83, 85

(56) References Cited

U.S. PATENT DOCUMENTS

| | | | | | |
|---|---|---|---|---|---|
| 4,652,947 A | * | 3/1987 | Oka et al. | ...................... | 360/85 |
| 4,841,391 A | * | 6/1989 | Iwasaki et al. | ............... | 360/85 |
| 5,061,848 A | * | 10/1991 | Choi | ........................... | 250/229 |
| 5,430,586 A | * | 7/1995 | Koo | ............................. | 360/95 |
| 6,111,721 A | * | 8/2000 | Kim et al. | .................... | 360/94 |

FOREIGN PATENT DOCUMENTS

JP 6-20339 1/1994

\* cited by examiner

*Primary Examiner*—David Hudspeth
*Assistant Examiner*—K. Wong
(74) *Attorney, Agent, or Firm*—Parkhurst & Wendel, L.L.P.

(57) ABSTRACT

A mode switch (9) for use in a magnetic recording and reproducing apparatus such as a VTR as well as a signal processing method therefor, in which the mode switch uses a small number of terminals and is prevented from misdetection when noise occurs. If the logic of an output from the mode switch (9) is checked, the output is determined based on an order preset for loading or unloading only if a predicted logic is obtained.

7 Claims, 14 Drawing Sheets

F I G. 7

| POSITION DETECTING SECTION | OUTPUT | | | | DECIMAL |
|---|---|---|---|---|---|
| | 4 | 3 | 2 | 1 | |
| A | 0 | 0 | 1 | 1 | 3 |
| B | 0 | 1 | 0 | 1 | 5 |
| C | 0 | 1 | 1 | 0 | 6 |
| D | 1 | 0 | 0 | 1 | 9 |
| E | 1 | 0 | 1 | 0 | 10 |
| F | 1 | 1 | 0 | 0 | 12 |

F I G. 1 1
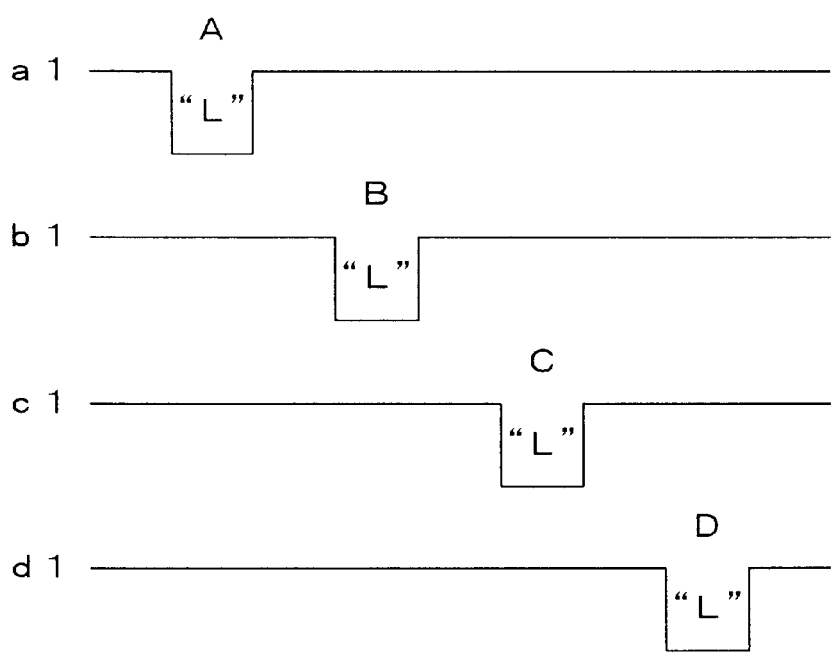

SIGNAL PROCESSING METHOD AND MODE SWITCH FOR MAGNETIC RECORDING AND REPRODUCING APPARATUS

TECHNICAL FIELD

The present invention relates to a mode switch for a magnetic recording and reproducing apparatus such as a VTR which detects an operating position of a loading mechanism for loading or unloading tapes as well as a control method for the mode switch.

BACKGROUND ART

FIGS. 8 and 9 show a mode switch 9 used for conventional magnetic recording and reproducing apparatuses.

The mode switch 9 comprises a bearing 1a formed in the center of a housing 1 formed of an insulator, and a common pattern 2 and a detection pattern 3 each formed concentrically in an inner bottom portion of the housing 1 on an end surface thereof and composed of a conductive material such as copper.

Reference numeral 4 denotes a rotor formed of an insulator and having a boss portion 4a which is formed in the center thereof and which is rotatably engaged with the bearing 1a of the housing 1. The rotor 4 has a brush 5 formed on an end surface thereof and composed of a conductive material, the brush 5 rotating integrally with the rotor 4. The brush 5 maintains contact with the common pattern 2 and the detection pattern 3 and is rotated while being arranged in a substantially radial direction in a line.

As shown in FIG. 9, the detection pattern 3 is divided into four position detecting sections A to D having terminals a1, b1, c1, and d1, respectively, extended therefrom. These detection positions are electrically separated and are not electrically connected together.

FIG. 10 shows the mechanism of a magnetic recording and reproducing apparatus using the mode switch 9. Reference numeral 6 denotes a motor operated by means of outputs from a system control circuit 20.

Rotational outputs from the motor 6 are joined to a loading mechanism 21 via a gear 7 and a reduction gear 8. The loading mechanism 21 loads and unloads a tape. While this mechanism is operative, the mode switch 9, having the rotor 4 joined to the reduction gear 8, rotates and the common pattern 2 on an inner circumferential side and each detection pattern 3 on an outer circumferential side are short-circuited by brush 5 in conjunction with the rotation to enter a conductive or open state.

A common terminal COM of the mode switch 9 is connected to an L (Low) level, while the terminals a1, b1, c1, and d1 of the mode switch 9 are pulled up to an H (High) level, with these levels input to the system control circuit 20 so that the rotation of the motor 6 can be controlled by means of a microcomputer (not shown) to achieve appropriate operations.

FIG. 11 shows a signal which is input to the system control circuit 20 if the mode switch 9 is rotated, and when the brush 5 is rotated once counterclockwise from between the detection positions A and D shown in FIG. 9.

For example, at the detection position A, the brush 5 is in contact with the common pattern 2 and with the detection pattern connected to the terminal a1. In FIG. 10, a switch for the terminal a1 of the mode switch 9 becomes conductive and is pulled up, so that an input from the terminal a1 to the system control circuit 20 has the L level, while the other terminals are in the open state and thus have the H level.

Likewise, at the detection position B, the terminal b1 has the L level, while the other terminals have the H level. At the detection position C, the terminal c1 has the L level, while the other terminals have the H level. At the detection position D, the terminal d1 has the L level, while the other terminals have the H level.

Since the common pattern 2 is electrically connected to no detection pattern at passed positions other than the detection position, the outputs from the terminals a1 to d1 all have the H level. The logic of the signal input to the system control circuit 20 varies depending on the detection position A to D, so that checking the logic of the input from the mode switch 9 enables the loading mechanism to be detected at the position A to D.

FIGS. 12(a), (b), and (c) show how a tape is loaded.

Reference numerals 10, 11, 12, and 13 denote a cassette, a magnetic tape, a drawing post, and a cylinder. FIG. 12(a) shows an unloading state where the brush 5 of the mode switch 9 is at the detection position A. FIG. 12(b) shows a half loading state where the brush 5 of the mode switch 9 is at the detection position B. FIG. 12(c) shows a loading completed state where the brush 5 of the mode switch 9 is at the detection position D. The position of the brush 5 of the mode switch 9 moves in connection with the loading mechanism 21 as shown in FIG. 10, so that each loading position corresponds to the detection position.

Thus detecting the output from the mode switch 9 enables the position of the loading mechanism 21 to be detected, and controlling the motor 6 enables the tape loading operation to be controlled.

Since the detection positions A to D of the mode switch 9 shown in FIG. 9 each correspond to one of the loading positions, checking the output of each terminal enables its absolute position to be determined. This type is hereafter referred to as an "absolute-position detection type".

FIG. 13 is another type (relative-logic-based detection type) of mode switch 9.

The detection patterns 3 connected to the terminals a2, b2, and c2 are sequentially and concentrically formed outward from a central portion of the mode switch, with the common patterns 2 concentrically formed in an outermost periphery of the mode switch and each connected to a terminal COM. Portions J of the same concentric track which are shown by broken lines are i electrically connected together but the surfaces thereof are molded of an insulator such as a resin.

FIG. 14 shows input signals to the system control circuit 20 shown in FIG. 10, which are obtained if the mode switch 9 is rotated. The signals shown in FIG. 14 are obtained when the brush 5 shown in FIG. 13 is rotated once counterclockwise from between the detection positions A and D.

In the case of the absolute-position detection type mode switch 9 shown in FIG. 9, timings for the detection positions depend on the pattern length of each detection pattern 3 at the detection position A to D. In the case of the mode switch 9 shown in FIG. 13, however, the common pattern 2 is divided into the positions A to D and the timings for the detection positions do not depend on the length of the detection pattern 3 but generally on the length of each position A to D of the common pattern 2. Since the closer to the outermost concentric circle the position is, the longer the circumferential length per angle is and the higher the angular precision obtained is, the common pattern 2 is disposed peripherally.

Also in the mode switch 9 shown in FIG. 13, the logic of the output of the terminal a2, b2, or c2 varies depending on the detection position A to D, so that determining the logic enables the loading position to be detected. In this type of mode switch, the detection patterns 3 connected to the terminals a2, b2, and c2 do not correspond to the different loading positions, but determining the output logic of the terminals a2, b2, and c2 enables the loading position to be determined. This type is hereafter referred to as a "relative-logic-based detection type".

To realize many functions of a magnetic recording and reproducing apparatus such as a VTR, inputs from many switches or sensors are connected to the microcomputer in the system control circuit 20, so that a mode switch is required which obtains accurate outputs using as few inputs to the system control unit 20 as possible.

In the "absolute-position detection type" mode switch 9, since each terminal corresponds to one of the loading positions, if chattering or noise occurs in the brush, the terminal may have the same logic as any of the passed positions but never has that as the other detection positions. This prevents an incorrect detection position from being detected as the loading position.

A known control method that is used if noise occurs in the "absolute-position detection type" mode switch 9 is described in Japanese Patent Laid-Open No. 1-67748. With this method, a drive mechanism is stopped simultaneously with a change in the output level of the mode switch, and a fixed period of time later, the mode switch is checked to restart the drive mechanism if the output has changed. This operation is repeated to stop the mode switch at a regular position.

The "absolute-position detection type" mode switch requires as many detection positions 3 and terminals as the detection positions. Since the number of terminals increases consistently with the number of detection positions, an increase disadvantageously occurs in the number of wires for connecting the mode switch 9 and the system control circuit 20 together and in the number of input ports to the system control circuit 20.

On the other hand, the "relative-logic-based detection type" requires fewer terminals than the "absolute-position detection type", but an incorrect detection position is detected as the loading position if noise occurs in the output. If, for example, at the detection position B, chattering or the like in the brush 5 causes a high noise to change the output of the terminal c3 to H level, as shown in FIG. 15, the terminal a2, b2, and c2, which should actually have the L, H, and L levels, respectively, at this position, have the L, H, and H levels, respectively, constituting the same logic as that established at the detection position D.

FIG. 17 shows an example of a conventional mode switch control method wherein the process starts from the detection position A and stops at the detection position D. A general method comprises periodically reading the output of the mode switch 9 a number of times to establish the position detected with the same logic established.

FIG. 16 is a view useful in explaining timings with which the output of the mode switch is read, and FIG. 15 shows details of noise occurring at the terminal c2 of the detection position B.

In FIG. 16, <1> to <5> show timings with which the output of the mode switch is checked using fixed cycles. The line shown by the alternate long and short dash line denotes a threshold above which the level is determined to be H and below which it is determined to be L. For example, the output is continuously checked three times, and if the same logic is detected, that logic is established. The broken line denotes noise. At <1>, the output is at the L level. At <2>, noise lower than the threshold level occurs and the output is at the L level. At <3> to <5>, the H level is read due to noise. Since the H level is continuously read three times, the level is determined to be H upon the reading at <5>.

With the reading based on this method, in case of FIG. 15, if the level of noise exceeds the threshold and its width is longer than a timing for establishing the logic, the logic is mistakenly determined, causing the mode switch to be stopped at the position D, which should actually be the position B. As a result, the apparatus may malfunction.

It is an object of the present invention to provide a mode switch that obtains reliable output signals with a small number of terminals as well as a control method therefor.

Disclosure of Invention

To attain this object, the present invention provides a relative-logic-based detection type mode switch wherein if an output signal different from that corresponding to the turn of a predicted detection position is obtained, that output signal is neglected, whereas only if a logic signal for the predicted detection position is obtained, that logic signal is established.

This configuration reduces the possibility of misdetection even if noise occurs during the process to provide the same logic at an incorrect detection position. The possibility of misdetection is further reduced by checking whether a logic signal for a passed position before or after the detection position is obtained.

In addition, an abnormal-position-detection position that allows more common and detection patterns to be electrically connected together than in a normal loading and unloading operating range is provided outside the same range so that upon detecting an abnormal-position-detection pattern, a loading or an unloading operation is stopped or the loading operation is switched to the unloading operation and vice versa. Then, even if misdetection causes the detection position to be passed, detecting the abnormal-position-detection position enables appropriate control to prevent malfunctions. Different combinations of common and detection patterns are electrically connected together at different positions, and the number of detection patterns that are electrically connected to the common pattern is fixed at a constant number of two or larger. This reduces the possibility of mistakenly detecting an incorrect detection position as the loading position even if noise such as chattering occurs.

As described above, according to the present invention, a relative-position-based detection type mode switch with fewer terminals gives an advantageous effect of providing a reliable output that is unlikely to cause an incorrect detection position to be detected as the loading position. It also has an effect of facilitating creation of a control program for the mode switch due to considerations for the order of the logic of outputs from the mode switch.

BRIEF DESCRIPTION OF DRAWINGS

FIG. 7 is a view useful in explaining decimal converted values for the mode switch according to Embodiment 6;

FIG. 11 is an output waveform diagram of the conventional mode switch of the absolute-position detection type;

BEST MODE FOR CARRYING OUT THE INVENTION

Each embodiment of the present invention will be described below with reference to FIGS. 1 to 7.

Embodiment 1

Figure 1:
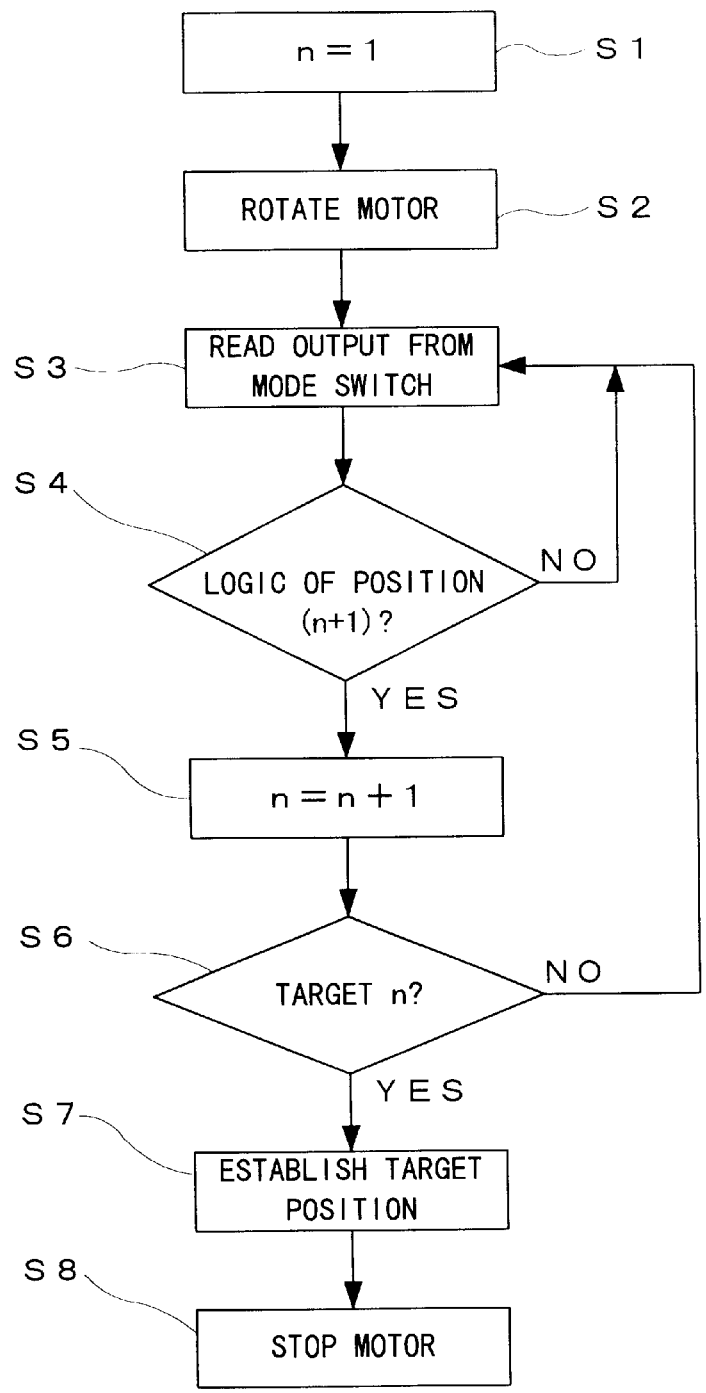
FIG. 1 is a flow chart showing a signal processing method according to Embodiment 1 of the present invention.
Figure 10:
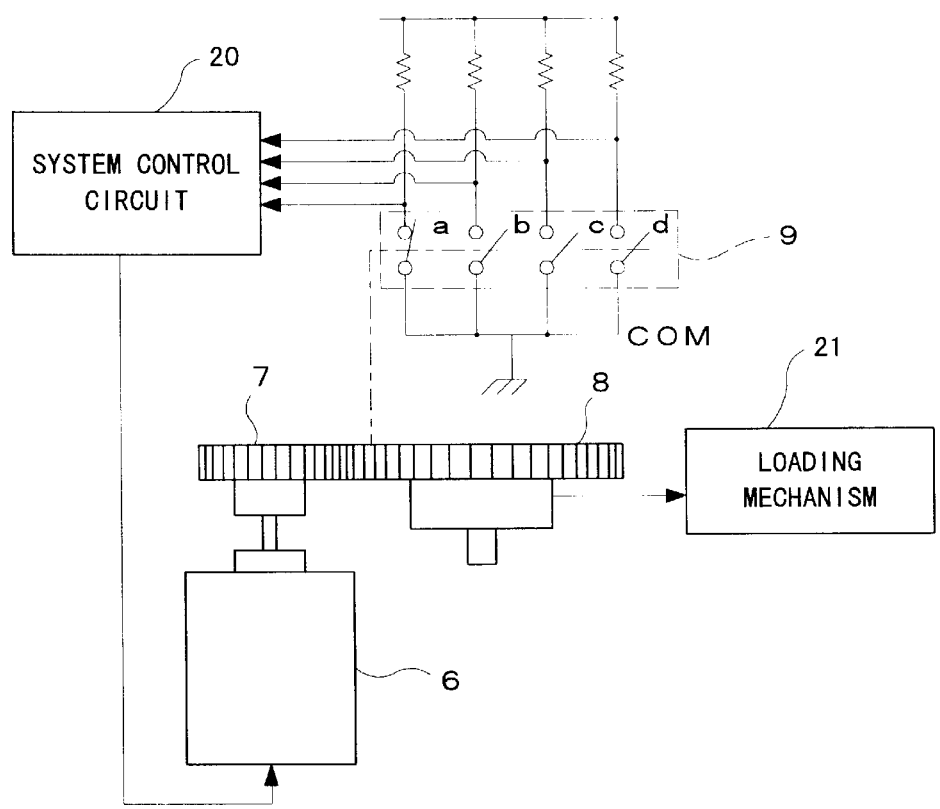
FIG. 10 is a view explaining a magnetic recording and reproducing apparatus.
Figure 12:
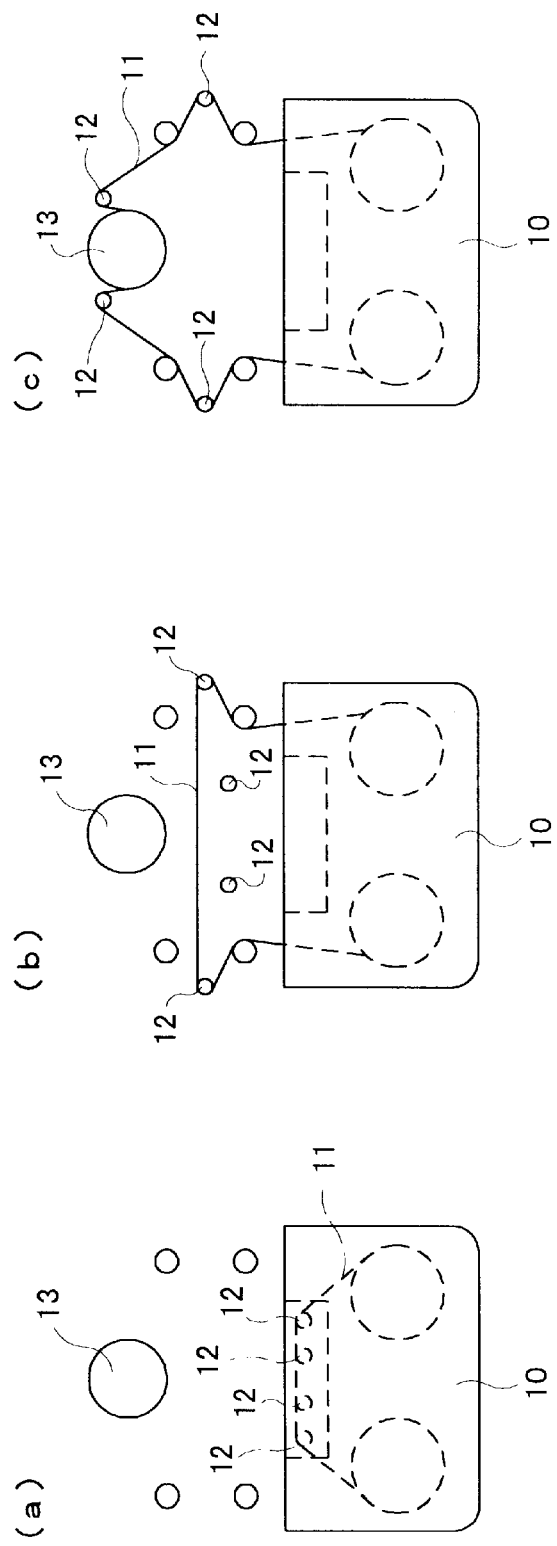
FIG. 12 is a view useful in explaining an unloading position, a half loading position, and a loading completing position.
Figure 13:
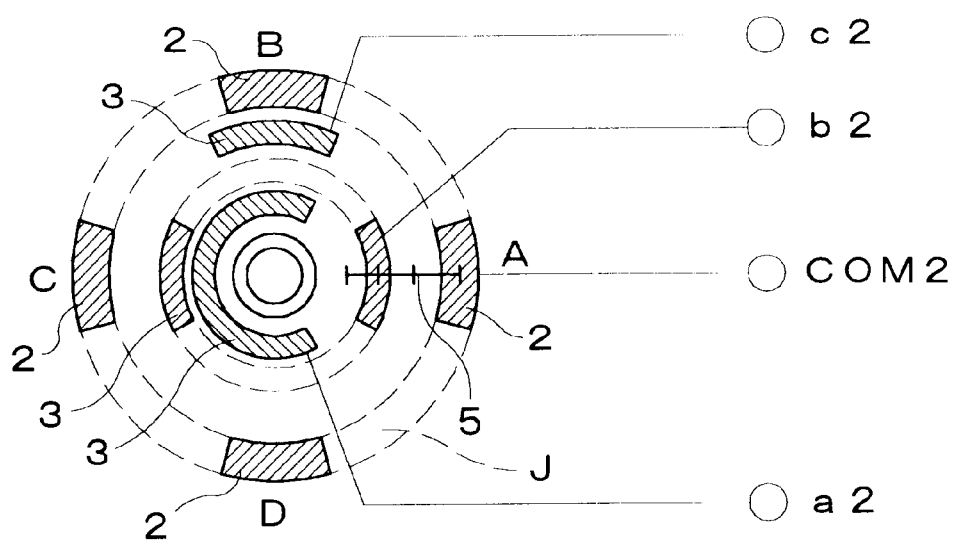
FIG. 13 is a top view of a contact pattern of a conventional mode switch of a relative-logic-based detection type.
Figure 14:
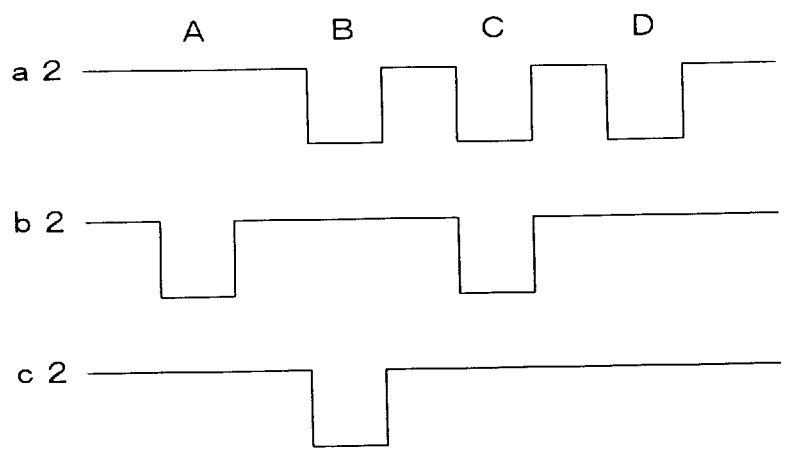
FIG. 14 is an output waveform diagram of the conventional mode switch of the relative-logic-based detection type.

FIG. 1 shows an example of a flow chart for a microcomputer in which the "relative-logic-based detection type" mode switch 9 shown in FIG. 13 is read by the system controller 20 shown in FIG. 10.

At a known current position (n), step S1 and step S2 are executed to start rotating the motor 6 to drive the loading mechanism 21. At step S3, the output levels of the terminals a2, b2, and c2 of the mode switch 9 are loaded.

At step S4, the logic of the next detection position (n+1) is predicted from the current position to determine whether the output from the mode switch 9 read at step S3 is the same as the predicted predetermined logic. If the output is not the same as the predicted logic, steps S3 and S4 are repeated.

When the match is detected at step S4, that detection position is determined to be correct and then established at step S5.

At step S5, the current position is renewed to (n+1), and at step S6, it is determined whether the position (n+1) is a target. If it is the target, the motor 6 is stopped at step S8 after step S7.

If the new position is determined not to be the target at step S6, steps S3 to S6 are repeatedly executed.

As described above, if the output from the mode switch differs from the predicted logic at step,S4, the possibility of detecting an incorrect detection position as the target can be reduced by executing control that repeats steps S3 and S4 until the predicted predetermined logic is obtained.

Figure 15:
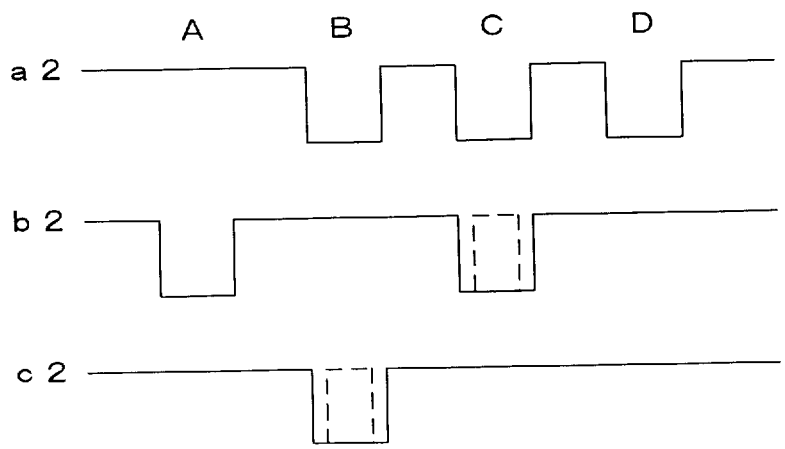
FIG. 15 is an output waveform diagram showing that noise occurs in the conventional mode switch of the relative-logic-based detection type.
Figure 16:
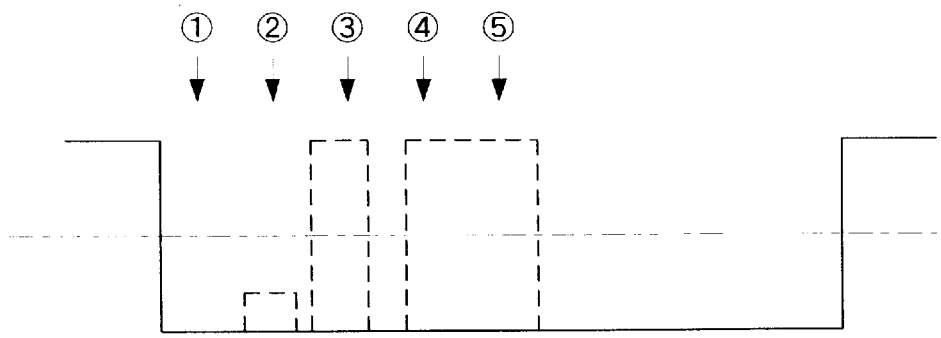
FIG. 16 is a view useful in explaining timings with which outputs from the mode switch are read.
Figure 17:
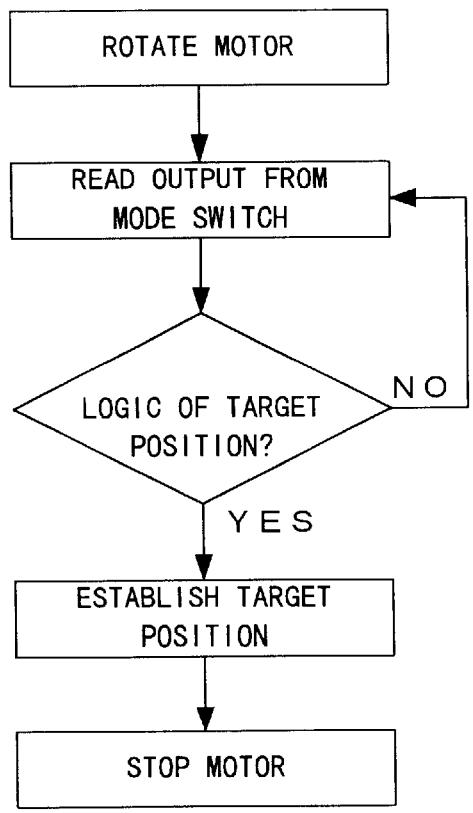
FIG. 17 is a flow chart of a conventional mode switch control method.

Specifically, when the process proceeds from the detection position A to the detection position D in FIG. 15 and even if noise occurs in the terminal 3 at the detection position B, Embodiment 1 starts from the detection position A and predicts the logic of the detection position B to periodically determine whether the output from the mode switch is the same as the logic of the position B. If the logic of the position B is obtained for a predetermined period of time before the noise, the detection position B is established at that point of time and the process waits for the logic of the detection position C. Consequently, if noise occurs later at the detection position B to provide the logic of the position D, that noise is neglected.

If the detection position B cannot be established before the noise, the output from the mode is checked with the logic of the position B predicted, so that noise resulting in the logic of the position D is neglected. Accordingly, as soon as the logic of the position B is obtained, the detection position B can be established. Moreover, if the noise is wide enough to occupy substantially all the period of the detection position B, the position B is passed without being established. In such a case, if the predicted detection position is not reached within a predetermined period of time, an abnormal state is determined to be occurring and appropriate control is provided to stop the process or return to the start of the process.

Embodiment 2

In Embodiment 1, the possibility of misdetection decreases, but if noise occurs in the terminal b2 after the detection position C in FIG. 15 has been established, that position is mistakenly detected as the detection position D. In this case, after each detection position has been established and a passed position where the outputs from all the terminals have the H level has then been detected, the next detection position may be established. That is, if noise occurs in the terminal b2 but not in the terminal a2 after the detection position C has been established, the same logic as that of the detection position D is provided. However, after the detection position C has been established, since a passed position where all the terminals have the H level have not been detected, the noise occurring position is neglected.

Even if the logic of the detection position C is provided again after the noise, this is also neglected because the process waits for the logic of the passed position. Thus, the possibility of misdetection further decreases compared to Embodiment 1.

Embodiment 3

Figure 2:
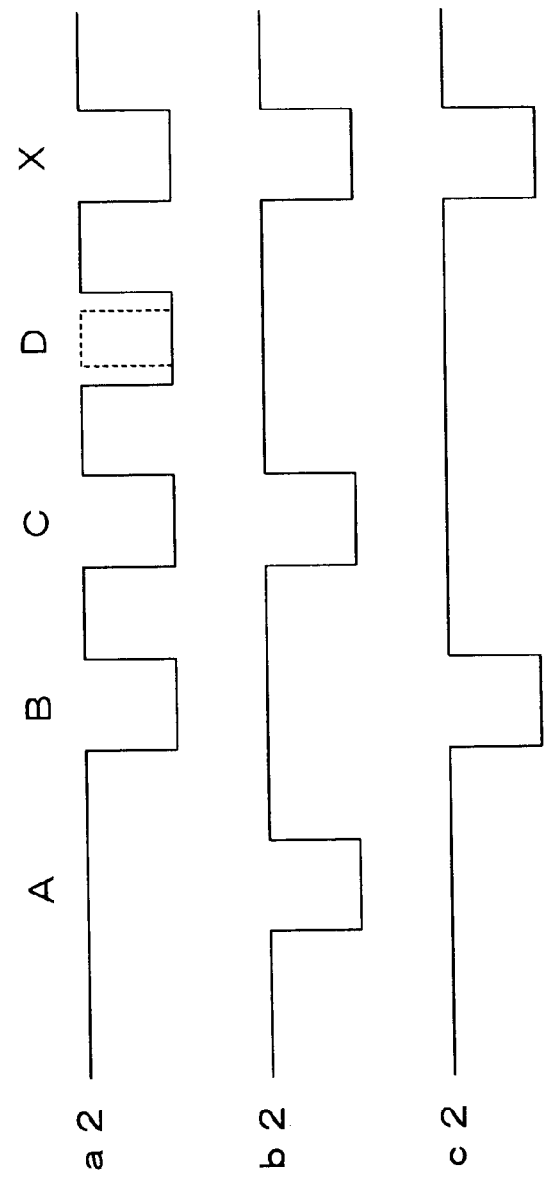
FIG. 2 is an output waveform diagram of a mode switch according to Embodiment 3 of the present invention.

FIG. 2 shows output signals from a mode switch in which an abnormal-position-detection position X that allows more common and detection patterns to be electrically connected together than a normal loading and unloading operating range is provided outside the same range.

In FIG. 2, the outputs from the terminals a2 to c2 all have the L level at the abnormal-position-detection position X. If noise occurs at the detection position D, that is, the loading completing position, which is thus passed without being detected, the logic of the detection position D cannot be obtained within a predetermined period of time without the abnormal-position-detection position. Thus, the process must be stopped after a predetermined amount of time or an operation such as unloading must be performed, the loading mechanism 21 is locked in a certain part of the process, possibly stressing the loading mechanism 21 or the motor 6.

On the other hand, with the abnormal-position-detection position provided to detect the logic of the detection position, the loading mechanism can be determined to lie outside the normal operating range. In this case, the abnormal-position-detection position must be determined whenever its logic is obtained.

The output from a terminal which should actually have the L level (the detection and common patterns are electrically connected together) often has the H level (the detection and common patterns are open) because the brush 5 and the patterns are separated from one another due to noise such as chattering. However, the output from a terminal which should, on the contrary, actually have the H level is unlikely to have the L level; with the logic of the abnormal-position-detection position that provides more L levels than the normal operating range, it can be determined that the abnormal-position-detection position is reached if the same logic is obtained.

Once the abnormal-position-detection position is established, if the loading operation is stopped or the unloading operation is performed to enable the detection position D to be detected, an appropriate action such as a predetermined operation can be performed. Such control serves to reduce the possibilities of malfunction and of locking the loading mechanism 21 or the motor 6 to cause stress.

Embodiment 4

Figure 3:
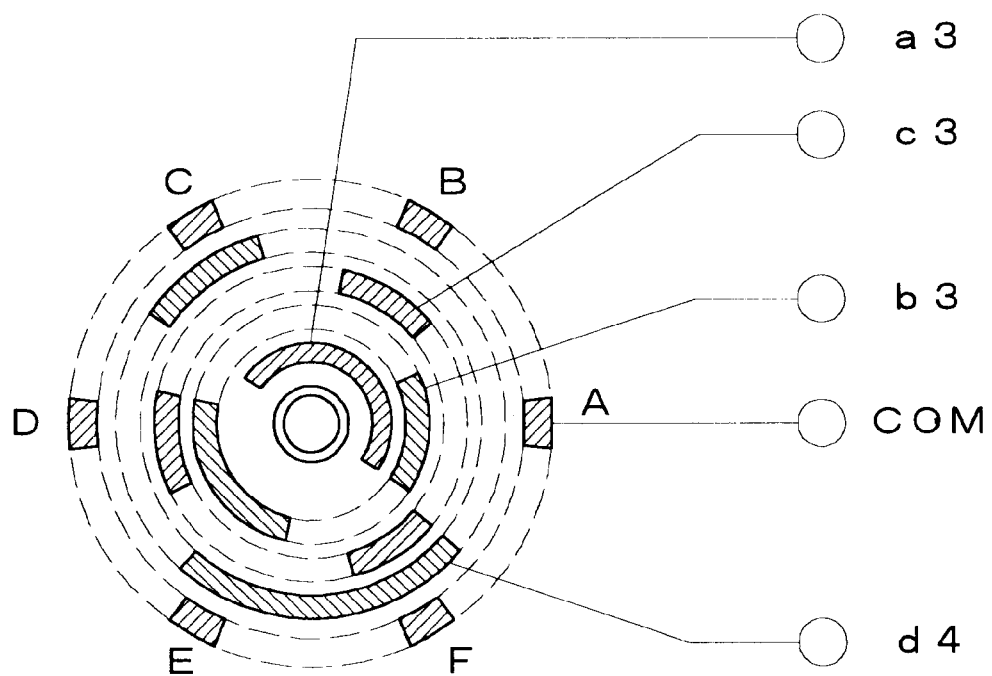
FIG. 3 is a top view of a contact pattern of a mode switch according to Embodiment 4 of the present invention.

FIG. 3 is a top view of a contact pattern of the mode switch 9 where different combinations of the common pattern and any of the detection patterns are electrically connected together at different detection positions and where the number of detection patterns that are electrically connected to the common pattern is fixed at two or larger.

Figure 4:
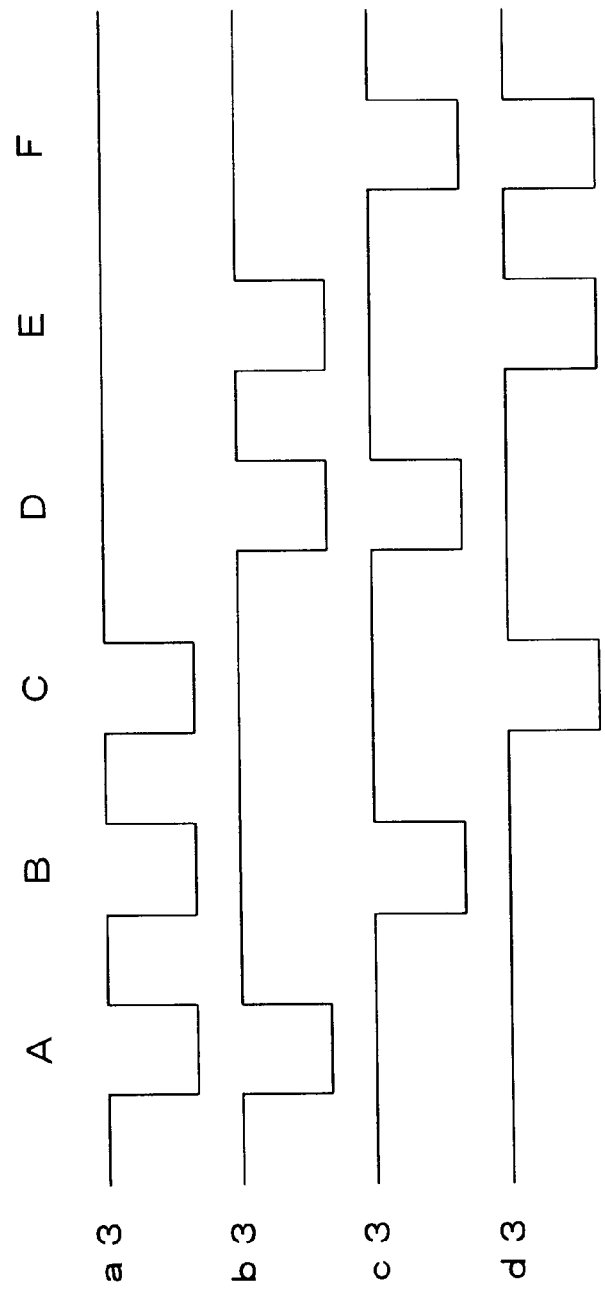
FIG. 4 is an output waveform diagram of the mode switch according to Embodiment 4.

FIG. 4 shows outputs from the switch 9. At each of the detection positions, any two of the terminals a3, b3, c3, and d3 are electrically connected together, that is, at the L level, and indicate a different logic. The number of possible combinations where four terminals are provided two of which have the L level is $_4C_2=6$, so that up to six detection positions can be formed. With this logic, if noise occurs to change any L level signal to the H level, the same logic is not obtained at different detection positions, thereby preventing an incorrect detection position from being detected as the loading position.

Additionally, since the L level is likely to be reliable as previously described, the presence of two L levels serves to determine that the loading position has been correctly detected; that is, in determining that the target position has been reached, checking whether there are two L levels enables the arrival to be reliably determined. Embodiment 4 realizes a mode switch that has six detection positions formed of five terminals including four terminals any two of which always have the L level as well as one common terminal, while an absolute-position detection type mode switch having the same number of detection positions requires seven terminals including six terminals and one common terminal. Similarly, the number of detection positions required by a relative-logic-based detection type mode switch having six terminals is $_6C_2=10$, whereas an absolute-position detection type mode switch having the same detection positions require eleven terminals including ten terminals and one common terminal. Consequently, with more detection positions, the relative-logic-based detection type requires fewer terminals than the absolute-position detection type.

Embodiment 5

Figure 5:
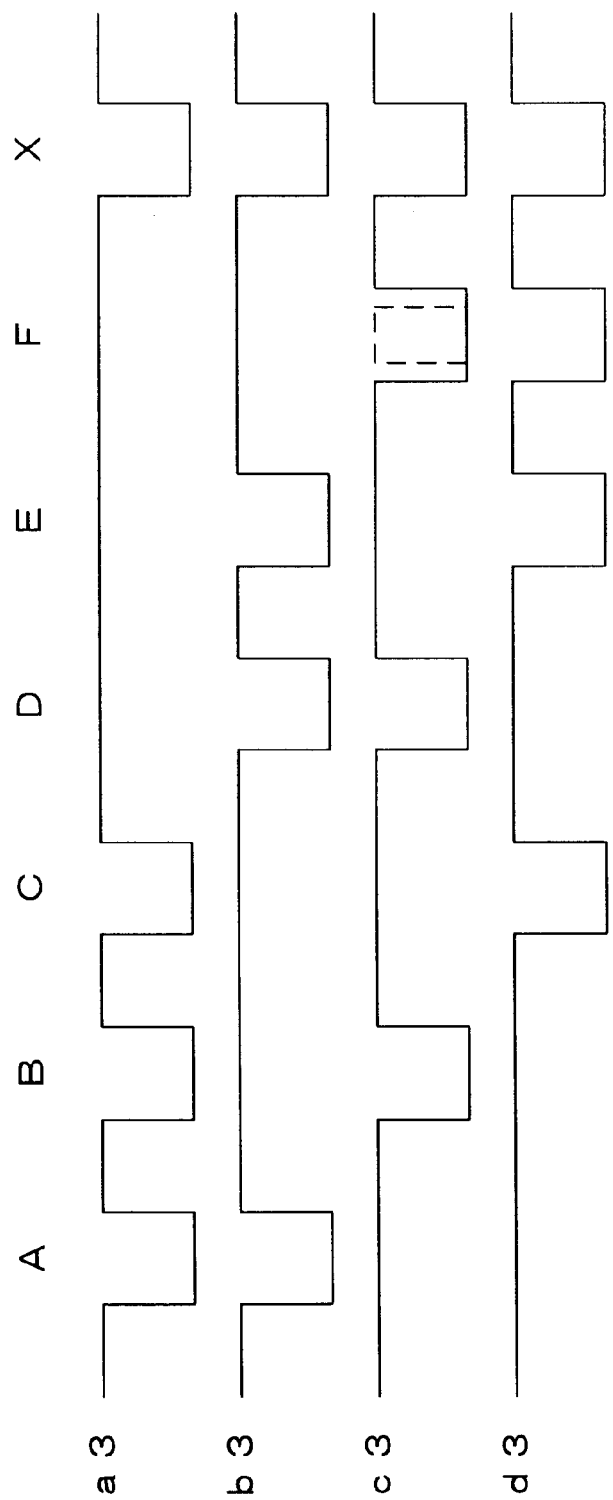
FIG. 5 is an output waveform diagram of a mode switch according to Embodiment 5 of the present invention.

FIG. 5 shows a mode switch 9 according to Embodiment 5.

The mode switch 9 in this embodiment has an abnormal-position-detection position X that allows more common and detection patterns to be electrically connected together than a normal loading and unloading operating range is provided outside the same range; in this figure, all the terminals have the L level at the abnormal-position-detection position X.

In FIG. 5, if noise occurs in the terminal c3 at the detection position F and the loading completing position is passed without being detected, the loading mechanism can be determined to lie outside the normal operating range, simply by detecting the abnormal-position-detection position. Further, after the abnormal-position-detection position has been detected and if the process is stopped or the unloading operation is performed to enable the position D to be detected, an appropriate action such as a predetermined operation can be performed. Such control serves to reduce the possibilities of malfunction and of locking the loading mechanism to cause stress.

The one abnormal-position-detection position X shown in FIG. 5 is provided between the detection positions F and A, but if power is turned on at the abnormal-position-detection position X, the system control circuit 20 can determine that the loading mechanism is located at an abnormal position but cannot determine whether the loading or unloading completing position has been passed. In this case, another abnormal-position-detection position X' is provided between the abnormal-position-detection position X and the detecting position A to provide such logic that the terminals a3, b3, and c3 have the L level, while the terminal d3 has the H level so that the loading mechanism 21 is locked between the abnormal-position-detection positions X and X'.

With this configuration, if the abnormal-position-detection position X is detected when the power is turned on, it can be determined that the loading completing position has been passed. If the abnormal-position-detection position X' is detected when the power is turned on, it can be determined that the unloading completing position has been passed.

Embodiment 6

Figure 6:
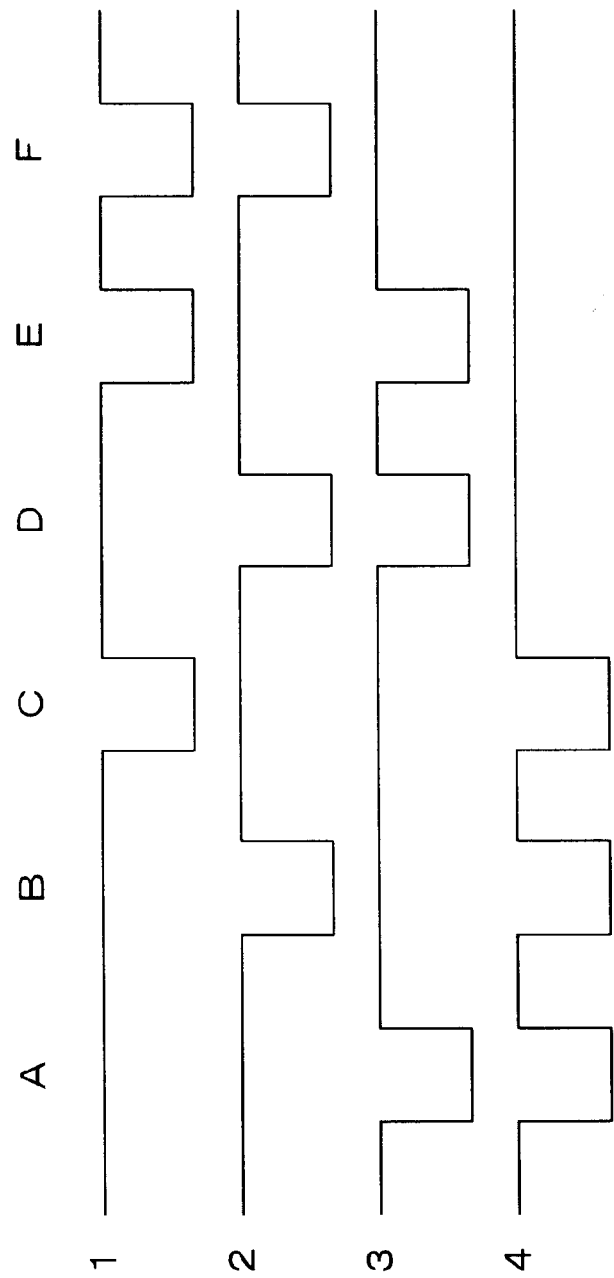
FIG. 6 is an output waveform diagram of a mode switch according to Embodiment 6 of the present invention.
Figure 8:
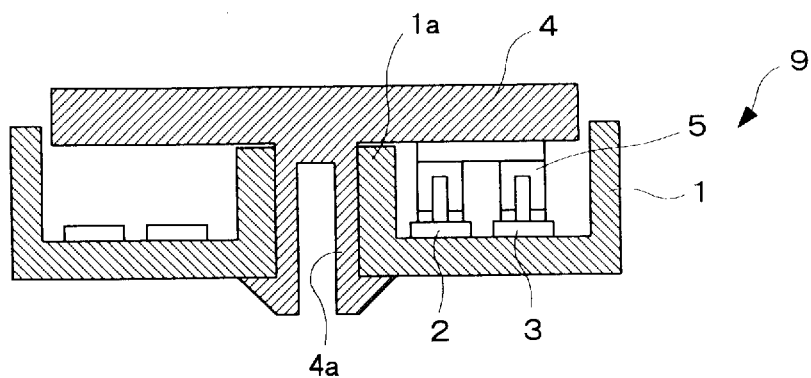
FIG. 8 is a sectional view of a conventional mode switch.
Figure 9:
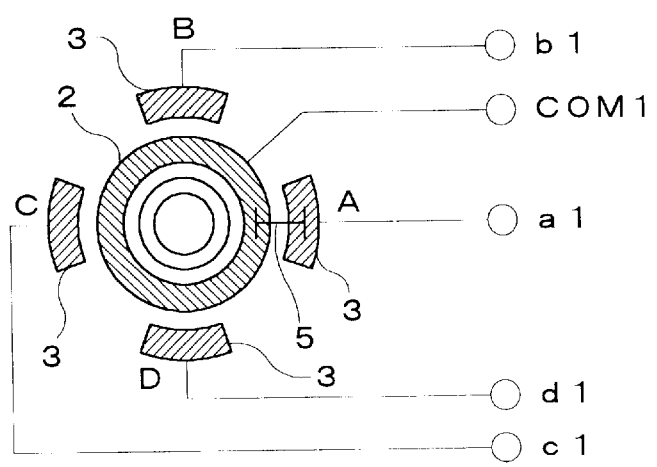
FIG. 9 is a top view of a contact pattern of a conventional mode switch of an absolute-position detection type.

FIG. 6 shows the mode switch 9 according to Embodiment 6.

In the mode switch 9 according to this embodiment, different combinations of the common pattern and any of the detection patterns are electrically connected together at different detection positions, the number of detection patterns that are electrically connected to the common pattern is fixed at two or larger, and when the logic of the output from the mode switch is assumed to be binary, the binary number increases sequentially from the unloading completing position to the loading completing position.

FIG. 7 is a table representing the logic of the output from the mode switch 9 in binary and decimal numbers. The decimal number increases from the unloading completing position to the loading completing position in the order of 3, 5, 6, 9, 10, and 12. This allows the position of the loading mechanism 21 to be easily determined and also facilitates creation of a control program. If after the detection position C, for example, loading speed is to be increased or a setting for tape tension is to be changed, control can be provided under the condition that "the decimal converted value for the output from the mode switch is six or more", thereby allowing the position of the loading mechanism to be easily determined and also facilitating creation of a control program.

What is claimed is:

1. A signal processing method for a magnetic recording and reproducing apparatus, characterized in that when output signals from a mode switch (9) are detected to detect positions to be detected during loading or unloading of a tape (11), the mode switch being driven in connection with loading and unloading operation of the tape (11) and being used to detect the positions by relatively moving detection patterns (3) provided at a plurality of detection positions and a brush (5) for contacting with the detection patterns (3), in the loading or unloading operation, if an output signal different from that corresponding to a predicted detection position is obtained, that output signal is neglected, whereas only if a logic signal for the predicted detection position is obtained, that logic signal is established as true signal for the position.

2. The signal processing method for a magnetic recording and reproducing apparatus according to claim 1, characterized in that if an output signal different from that corresponding to the predicted detection position is obtained, that output signal is neglected, whereas only if a logic signal for the predicted detection position and a logic signal for a passed position before or after the predicted detection position are obtained, the former logic signal is established as true signal for the position.

3. A contact type mode switch (9) for a magnetic recording and reproducing apparatus which rotates in connection with loading and unloading operations for a tape (11), characterized in that the mode switch comprises a common pattern (2) and at least two detection patterns (3), all the patterns being concentrically formed, as well as a brush (5) that rotates while contacting with the common pattern (2) and each of the detection patterns (3) in such a manner that the patterns are electrically connected together, and that the common pattern (2) and any two or more of the detection patterns (3) are electrically connected together at each detection position, and the common pattern (2) is electrically connected to none of the detection patterns (3) at a passed position, that different combinations of the common pattern (2) and any of the detection patterns (3) are electrically connected together at different detection positions corresponding to the respective detection patterns, that the number of detection patterns (3) which are electrically connected to the common pattern (2) varies depending on each detection position, and that an abnormal-position-detection position (X) where the common pattern (2) is electrically connected with the detection patterns (3) is provided outside a normal loading and unloading operating range where the common pattern and the detection patterns are electrically connected together, the number of the detection patterns at the abnormal-position-detection position (X) being larger than that in the normal operating range.

4. A contact type mode switch (9) for a magnetic recording and reproducing apparatus which rotates in connection with loading and unloading operations for a tape (11), characterized in that the mode switch comprises a common pattern (2) and at least two detection patterns (3), all the patterns being concentrically formed, as well as a brush (5) that rotates while contacting with the common pattern (2) and each of the detection patterns (3) in such a manner that the patterns are electrically connected together, and that the common pattern (2) and any two or more of the detection patterns (3) are electrically connected together at each detection position, and the common pattern (2) is electrically connected to none of the detection patterns (3) at a passed position, that different combinations of the common pattern (2) and any of the detection patterns (3) are electrically connected together at different detection positions corresponding to the respective detection patterns, and that the number of detection patterns (3) which are electrically connected to the common pattern (2) is fixed at a constant number of two or more.

5. The mode switch for a magnetic recording and reproducing apparatus according to claim 4, characterized in that when logic of an output from the mode switch (9) is assumed to be binary, this number increases or decreases sequentially from an unloading completing position to a loading completing position or from the loading completing position to the unloading completing position.

6. The mode switch for a magnetic recording and reproducing apparatus according to claim 4, characterized in that an abnormal-position-detection position (X) that allows more common patterns (2) and detection patterns (3) to be electrically connected together than a normal loading and unloading operating range is provided outside the normal loading and unloading operating range.

7. A signal processing method for a magnetic recording and reproducing apparatus, comprising the steps of providing a mode switch including a common pattern (2) and at least two detection patterns (3), all the patterns being concentrically formed, as well as a brush (5) that rotates while contacting with the common pattern (2) and each of the detection patterns (3) in such a manner that the patterns are electrically connected together, wherein the common pattern (2) and any two or more of the detection patterns (3) are electrically connected together at each detection position, and the common pattern (2) is electrically connected to none of the detection patterns (3) at a passed position, wherein different combinations of the common pattern (2) and any of the detection patterns (3) are electrically connected together at different detection positions corresponding to the respective detection patterns, wherein the number of detection patterns (3) which are electrically connected to the common pattern (2) varies depending on each detection position, and providing an abnormal-position-detection position (x) where the common pattern (2) is electrically connected with the detection patterns (3) outside a normal loading and unloading operating range where the common pattern and the detection patterns are electrically connected together, the number of the detection patterns at the abnormal-position-detection position (x) being larger than that in the normal operating range, wherein while outputs from the mode switch are being processed, when an abnormal-position-detection position (X) is detected, a loading operation or an unloading operation is stopped, or the loading operation is switched to the unloading operation or the unloading operation is switched to the loading operation.

* * * * *